United States Patent [19]

Siga et al.

[11] Patent Number: 4,724,190
[45] Date of Patent: Feb. 9, 1988

[54] STORAGE BATTERY

[75] Inventors: Tomokazu Siga; Ichiro Sano; Akihiro Tsubuki, all of Yokohama; Kimio Shinmura, Tokyo; Noritaka Koga, Sakado; Shoji Motodate, Fujimi, all of Japan

[73] Assignees: Furukawa Denchi Kabushiki Kaisha, Kanagawa; Honda Giken Kogyo Kabushiki Kaisha, Tokyo, both of Japan

[21] Appl. No.: 819,429

[22] Filed: Jan. 16, 1986

[30] Foreign Application Priority Data

Jan. 17, 1985 [JP]  Japan .............................. 60-3573[U]
Jan. 25, 1985 [JP]  Japan .............................. 60-11953

[51] Int. Cl.[4] ............................................. H01M 2/24
[52] U.S. Cl. ................................... 429/158; 429/160; 429/175; 429/176
[58] Field of Search .................... 424/158, 160, 175, 176

[56] References Cited

U.S. PATENT DOCUMENTS

| | | | |
|---|---|---|---|
| 1,897,597 | 2/1933 | Wallace | 429/175 |
| 3,313,658 | 4/1967 | Sabatino et al. | 429/159 |
| 3,364,076 | 1/1968 | Buttke et al. | 429/159 |
| 3,388,005 | 6/1968 | Hahn et al. | 429/159 |
| 3,600,232 | 8/1971 | Daguenet | 429/160 |
| 4,107,398 | 8/1978 | Lindenberg et al. | 429/175 X |

FOREIGN PATENT DOCUMENTS

| | | | |
|---|---|---|---|
| 0140581 | 5/1985 | European Pat. Off. | |
| 1914779 | 10/1970 | Fed. Rep. of Germany | |
| 3238485 | 4/1984 | Fed. Rep. of Germany | |
| 0968250 | 11/1950 | France | |
| 2125340 | 9/1972 | France | |
| 2267643 | 11/1975 | France | |
| 2374747 | 7/1978 | France | |
| 2389241 | 11/1978 | France | |
| 2420849 | 10/1979 | France | |
| 2442511 | 7/1980 | France | 429/125 |
| 1381265 | 1/1975 | United Kingdom | |
| 1392097 | 4/1975 | United Kingdom | |
| 1408788 | 10/1975 | United Kingdom | |
| 1506494 | 4/1978 | United Kingdom | |
| 1543628 | 4/1979 | United Kingdom | |
| 2030350 | 4/1980 | United Kingdom | |

Primary Examiner—Brian E. Hearn
Assistant Examiner—Stephen J. Kalafut
Attorney, Agent, or Firm—Sandler & Greenblum

[57] ABSTRACT

A storage battery including a container and a cover. The container is partitioned into a plurality of cell chambers by a plurality of partition walls. Each cell chamber has a cell therein which is composed of positive and negative plates. The negative and positive plates are connected by negative and positive straps, respectively. An intercell connecting conductor connects negative and positive straps from adjacent cells through an opening in the partition wall. Each intercell connecting conductor includes a horizontal base attached to one of the straps, and an ear which extends obliquely upwardly from the base to the opening in the partition wall. The opening in the partition wall and the ear are laterally offset from the base so that they are vertically unaligned with the base. As a result, the forward tip of a welding gun used to weld two ears from adjacent cells together through the opening in the partition wall will not contact the base even when the height of the ear is of a height that would otherwise permit such contact between the welding gun and the base. The battery also includes positive and negative terminals. The walls of the container and the cover surrounding these terminals are lower than the upper edge of the nearest partition wall directly above the opening. Consequently, the terminals can have a reduced height compared to conventional storage batteries, thereby resulting in less resistance and a higher output, as well as a cheaper cost and a lower height.

9 Claims, 20 Drawing Figures

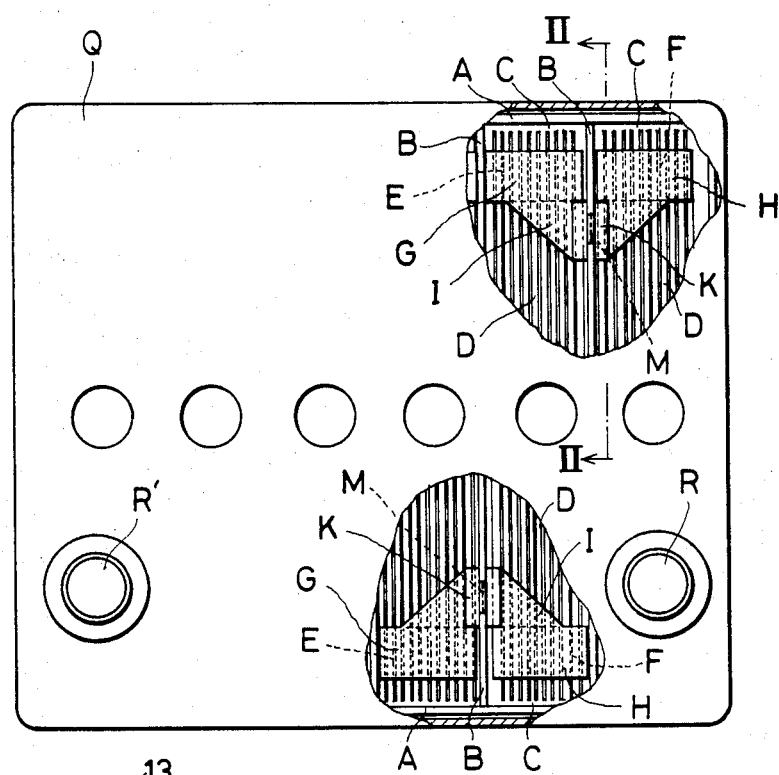
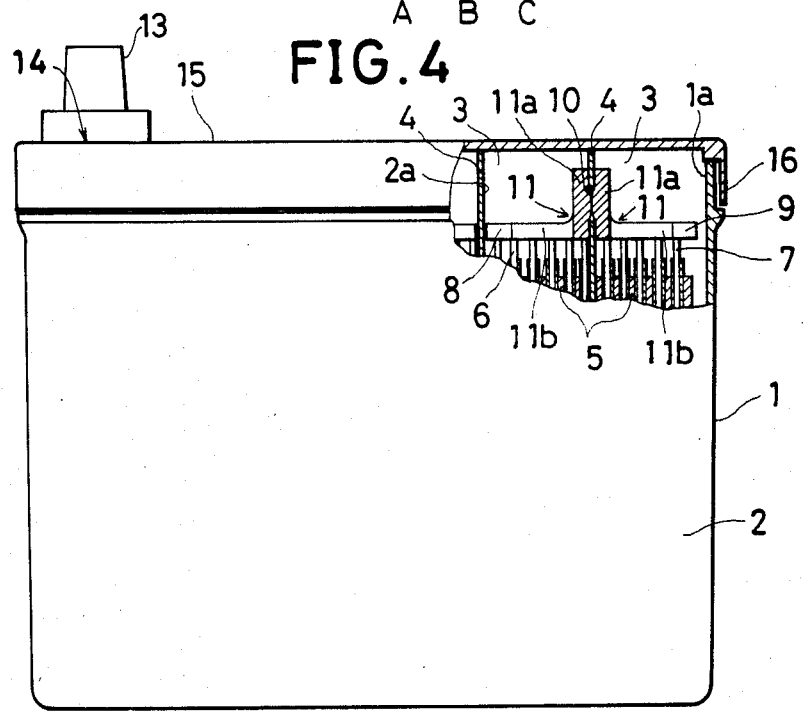

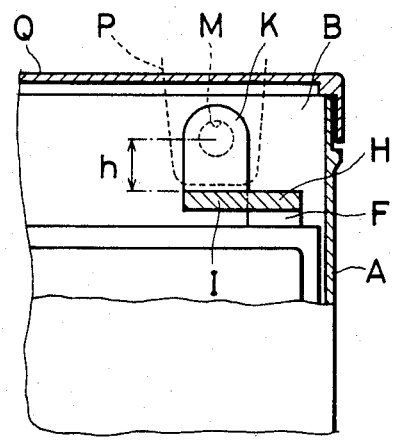
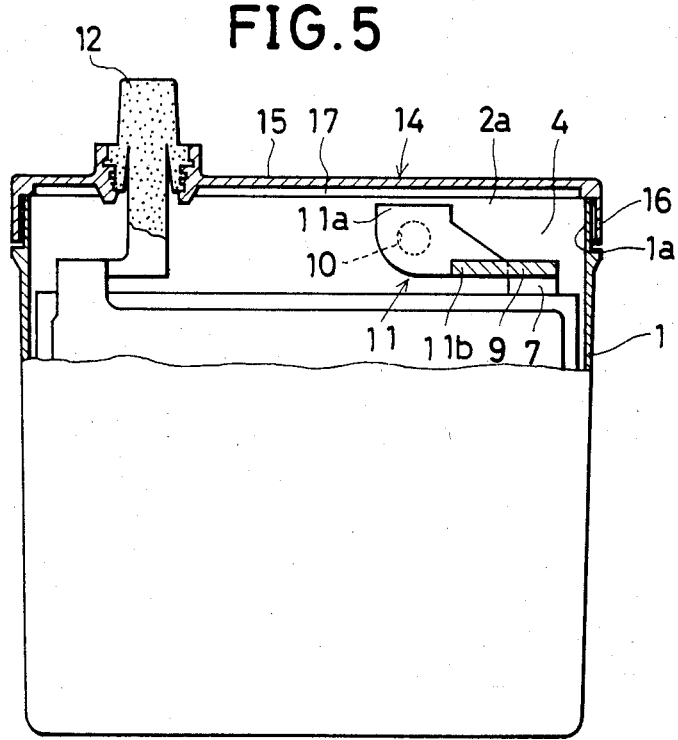

STORAGE BATTERY

BACKGROUND OF THE INVENTION

1. Field of the Invention

The invention relates to a heat-sealed type monoblock storage battery adapted for use in automobiles and similar devices.

2. Description of Pertinent Information

One type of storage battery comprises a battery container and a cover. The container comprises a plurality of cell chambers formed by partitioning the interior of a battery container with a plurality of partition walls. Each chamber comprises a cell or electrode plate assembly. Each cell comprises a plurality of negative plates and a row of tabs protruding from the upper edges of the negative plates. A strap, called a negative strap because it is attached to the negative plates, interconnects the tabs. Each cell and electrode plate assembly also comprises a plurality of positive plates and a row of tabs protruding from the upper edges of the positive plates. A strap called a positive strap, interconnects the positive tabs.

A positive strap from one cell is connected to a negative strap from a mutually adjacent cell by intercell connecting conductors which extend through a hole in the partition wall separating the adjacent cells. Each intercell connecting conductor comprises a horizontal base and an ear extending upwardly from the horizontal base so as to face the hole in the partition wall. One of the negative straps is used as a negative terminal. This strap is provided with a negative terminal post extending upwardly from this negative strap. Similarly, one of the positive straps is used as a positive terminal. This strap is provided with a positive terminal post extending upwardly from the positive strap.

The battery cover has a box-like shape which is adapted to cover the battery container. The cover comprises a top wall, a downwardly extending peripheral side wall extending downwardly from the top wall, and downwardly extending partition walls which partition the inside space of the battery cover. The side and partition walls are adapted to be brought into contact with and hermetically adhered to a peripheral side wall and the partition walls, respectively, of the battery container. The top wall of the cover also comprises negative and positive terminal settling holes adapted to receive therethrough the upper part of the negative and positive posts, respectively, and the top wall further comprises negative and positive terminal settling surface regions surrounding the negative and positive terminal settling holes, respectively. Furthermore, the positive and negative posts are adapted to extend through these settling holes to the outside of the battery to form a positive and a negative terminal on respective terminal settling surface regions of the top wall of the cover.

Such a known battery is illustrated in FIGS. 1 and 2. This battery will now be discussed with respect to these two figures.

The battery illustrated in FIGS. 1 and 2 comprises a battery container A comprising a plurality of partition walls B which form a plurality of cell chambers C. Within each of the cell chambers is formed a cell D. Each cell comprises an electrode plate assembly including a plurality of negative electrodes and a plurality of tabs E forming a row. Each tab E is attached to a negative electrode. Each cell also comprises a plurality of positive electrodes and a row of tabs F attached to the positive electrodes. Also provided in each cell are strap G and strap H. Strap G connects negative tabs E, and therefore strap G is called a negative strap. Similarly, strap H connects the positive tabs F and is therefore called a positive strap. Straps G and H of adjacent cells are aligned with one another on either side of a partition wall B separating adjacent cells D, D. In addition, the battery also comprises intercell connecting conductors which connect straps G and H. The conductors comprise horizontal base parts I, I which project horizontally and laterally, that is inwardly, from straps G and H. In addition, the intercell connecting conductors also comprise ear portions K, K which extend vertically upward from base parts I, I so as to extend along and close to opposite sides of partition wall B. These ears K, K of each intercell connecting conductor in adjacent cells face each other through a perforation hole or opening M in partition wall B. Ears K, K in adjacent cells are connected to each other through hole M by means of an electric welding. This is accomplished by applying a forward portion P of a welding gun to ear portions K, K, or by using any other desired connecting means. In addition, the battery further comprises a battery cover Q and negative and positive terminals R, R', respectively.

This storage battery has serious disadvantages which arise from the extending of ears K, K directly above base portions I, I, and because of the alignment of opening M with the upper portions of ears K, K. As a result of this positioning of these elements, when ears K, K are welded by a welding gun the forward end P of the welding gun contacts the upper surfaces of horizontal bases I, I which are located directly below ears K, K.

In order to prevent this undesireable welding of horizontal bases I, I, the distance between base portion I and perforation M can be increased by increasing the height h of ears k, k. However, this increasing of the height h of ears K, K of the intercell connecting conductors from base portion I to hole M causes other problems because the height of partition wall B must also be increased, thereby increasing the height of the storage battery. This is undesireable, particularly when such a storage battery is used in an automobile, where space is at a premium.

In addition, the above-discussed storage battery also has another disadvantage. The type of storage battery discussed above is made in such a manner that the battery container and the box-like battery cover are fused together at mutually abutting edges of their entire peripheral side walls in the same horizontal plane. As a result, the negative and positive terminal post settling holes in the top wall of the battery cover are positioned higher than the upper horizontal edges of the partition walls of the battery container. Thus, the space between the negative and positive terminal straps and the negative and positive terminal settling surface regions of the top wall of the battery cover, respectively, is comparatively large and the length of the negative and positive terminal posts from each corresponding strap to each respective negative and positive terminal settling hole is also comparatively large. Consequently, each terminal has a comparatively large electrical resistance thereby diminishing the amount of current that can be taken out from each terminal.

Thus, there is a need for a storage battery in which the positive and negative terminal posts of the battery are as small as practically possible, and in which the ears of the intercell connecting conductors are so positioned that the welding gun used to weld the intercell connecting conductors together does not contact the horizontal base portions of the conductor, without increasing the height of the battery.

SUMMARY OF THE INVENTION

It is an object of the present invention to provide a battery which overcomes the problems of the prior art.

It is another object of the present invention to provide a storage battery in which the terminals are smaller than conventional storage batteries, and in which the ears are so positioned that a welding gun does not contact the horizontal base of the intercell connecting conductor, without increasing the height of the battery.

The invention that achieves these objectives relates to a storage battery comprising at least adjacent two cells. Each of the cells comprises a plurality of negative plates, a negative strap interconnecting the negative plates, a plurality of positive plates, and a positive strap interconnecting the positive plates. The battery also comprises intercell connecting conductor means for connecting a negative strap and a positive strap from adjacent cells, a negative terminal formed from one of the negative straps, and a positive terminal formed from one of the positive straps. The negative terminal comprises a negative terminal post extending upwardly from one of the negative straps and the positive terminal comprises a positive terminal post extending upwardly from one of the positive straps. At least one of the following electrically conducting elements has a reduced height: the at least one intercell connecting conductor, the negative terminal post, and the positive terminal post.

The battery can further comprise more than two adjacent cells, and a plurality of intercell connecting conductors. Each cell comprises an electrode plate assembly comprising the plurality of negative and positive plates, and each cell comprises an intercell connecting conductor attached to one of the straps in the cell and adapted to be attached to an intercell connecting conductor in an adjacent cell.

In one embodiment the intercell connecting conductor means comprises at least two intercell connecting conductors, each connected to a strap in one of the cells. In this embodiment the battery further comprises a battery container, a battery cover, and a plurality of partition walls. The battery container comprises an interior and at least one peripheral side wall. The plurality of partition walls partition the interior of the battery container to form a plurality of cell chambers. At least two of the cell chambers are adjacent one another and are separated by a partition wall. The partition wall separating the at least two cell chambers has an opening therein, and each cell chamber comprises a cell.

The battery cover is box-shaped and is adapted to cover the container. The cover comprises a top wall, at least one peripheral side wall, and a plurality of partition walls. The top wall has positive and negative terminal settling openings adapted to receive, respectively, the positive and negative terminal posts therethrough. The top wall further comprises positive and negative terminal settling surface regions surrounding the positive and negative terminal settling openings, respectively. The positive and negative terminal posts form positive and negative terminals, respectively, on the positive and negative terminal settling surface regions of the top wall. The at least one peripheral side wall extends downwardly from the top wall and is adapted to abut and to be hermetically sealed to the peripheral side wall of the battery container. The plurality of partition walls extend downwardly from the top wall and are adapted to abut and to be hermetically sealed to the plurality of partition walls of the battery container.

Also in this embodiment the intercell connecting conductors connect the positive and negative straps through the opening in said partition wall. In addition, the negative straps each comprise an upper edge and a negative tab extending from said upper edge. The tabs on each of the negative plates form a row of tabs and the negative strap connects this row of negative tabs. Similarly, the positive straps each comprise an upper edge and a positive tab extending from this upper edge. The tabs on each of the positive plates form a row of tabs, and the positive strap connects this row of positive tabs. Furthermore, each intercell connecting conductor comprises a horizontal base and an ear extending upwardly from the base to face the opening.

In another embodiment the interconnected negative and positive straps from adjacent cells are aligned with each other. The horizontal base of the intercell connecting conductor in the cell housing the negative plates are connected to the negative strap and the horizontal base of the intercell connecting conductor in the cell housing the positive plates are connected to the positive strap. In addition, the ears of the intercell connecting conductors in adjacent cells extend obliquely upward from the horizontal base to which the ears are attached so as to be vertically unaligned with the horizontal base to which the ears are attached, and ears from adjacent cells face each other through the opening and are attached to each other through the opening by a welding comprising an electric weld.

In still another embodiment the container further comprises portions of low height surrounding the negative and positive terminal posts. The low height portions comprise horizontal upper edges that are positioned lower than the upper horizontal edge of that portion of the partition wall separating the at least two cells positioned directly above the opening. In addition, the positive and negative terminal settling surface regions of the top surface of the cover are lower in height than the horizontal upper edge of that portion of the partition wall separating the at least two cells positioned directly above the opening when the cover is attached to the battery container.

The low height portions surrounding the negative and positive terminal posts comprise two substantially ]-shaped portions each comprising a low height substantially L-shaped corner and a portion of the partition wall located nearest to the low height substantially L-shaped corner.

In addition, the low height portions surrounding the negative and positive terminal posts comprise two substantially L-shaped corner portions of the battery container.

In addition, the container further comprises two peripheral side walls and a plurality of slanted wall portions. The peripheral side walls each comprise a high level side wall portion comprising a horizontal upper edge. At least one of the slanted wall portions comprises a slanted upper edge positioned between one of the two substantially L-shaped corners of the battery container and one of the two high level upper edges of one of the high level side wall portions of one of the peripheral side walls.

In this embodiment the cover further comprises two peripheral side walls, two downwardly extending low height portions each surrounding one of said negative and positive terminal posts when the cover is attached to said container, a high level wall portion, and a plurality of slanted wall portions. The two downwardly extending low height portions each comprise a substantially L-shaped corner of one of the peripheral side walls of the cover. The substantially L-shaped corners of the cover each comprise a substantially L-shaped low height horizontal edge. The high level wall portion extends downwardly from the top wall and comprises a high level horizontal lower edge. The plurality of slanted wall portions extend downwardly from the top wall. The plurality of slanted wall portions comprise slanted lower edges. A at least one of the slanted lower edges comprises a slanted lower edge positioned between and connecting one of the substantially L-shaped low height horizontal edges of the low height downwardly extending wall portions and the high level horizontal lower edge of the high level downwardly extending wall portion of the cover.

Each of the plurality of partition walls of the container comprises a low height wall portion comprising a low height horizontal upper edge and a high level wall portion comprising a high level horizontal upper edge. The low height horizontal upper edge of the low height wall portion of the partition of the container is lower in height than the high level horizontal upper edge of the high level wall portion of the partition of the container. In addition, in this embodiment the container further comprises a plurality of slanted wall portions each comprising a slanted upper edge positioned between the low height horizontal upper edge of the low height wall portion of one of the partition walls of the container and the high level horizontal upper edge of one of the high level wall portions of one of the partition walls of the container. Also in this embodiment each partition wall of the cover comprises a low height downwardly extending portion comprising a horizontal lower edge and a high level downwardly extending portion comprising a high level horizontal lower edge. The horizontal lower edge of the low height portion of each partition wall of the cover is lower in height than the high level horizontal lower edge of the high level portion of each partition wall. Furthermore, in this embodiment the cover further comprises a plurality of downwardly extending slanted wall portions each comprising a slanted lower edge positioned between one of the low height horizontal lower edges of one of the low height wall portions of one of the partition walls of the cover and one of the high level horizontal lower edges of one of the high level wall portions of one of the partition walls of the cover.

In still another embodiment the container further comprises low height wall portions comprising horizontal upper edges of lower height than that portion of the at least one partition above the opening. The cover in this embodiment further comprises downwardly extending portions of low height surrounding the positive and negative terminal posts when the cover is attached to the battery container. The low height portions of the cover comprise low height horizontal lower edges and the low height horizontal lower edges of the low height portions of the cover abut and are hermetically sealed to the horizontal upper edges of the low height portions of the battery container.

The horizontal lower edges of the downwardly extending low height portions of the cover are lower in height than the rest of the cover, and the cover can further comprise two downwardly extending peripheral side walls. Each of the low height portions of the cover surrounding the negative and positive terminal posts comprises a substantially L-shaped corner of one of the downwardly extending peripheral side walls of the battery cover. In addition, the low height portions of the cover surrounding said negative and positive terminal posts can comprise two substantially ]-shaped portions each comprising a low height substantially L-shaped corner of one of the downwardly extending peripheral side walls of the battery and a portion of the partition wall located nearest to the low height substantially L-shaped corner.

In still another embodiment the at least one of the partition walls having the opening therein comprises a high level wall portion having a high level horizontal upper edge, two low height end wall portions and at least one slanted wall portion. The two low height end wall portions have low height horizontal upper edges having a lower height than the high level horizontal upper edge of the high level wall portion. The high level wall portion is positioned between the two end wall portions. The at least one slanted wall portion has slanted upper edges connecting the high level horizontal upper edge of the high level wall portion with one of the low height horizontal upper edges of the low height end wall portions. In this embodiment each of the partition walls of the container comprises the two low height end wall portions and the at least one slanted wall portion. In addition, the at least one peripheral side wall of the battery container further comprises an entire low height peripheral side wall comprising a low height horizontal upper edge that is lower in height than the high level horizontal upper edge of the high level wall portion of the partition wall provided with the opening. Further, the low height upper horizontal upper edges of the two low height end wall portions of each partition wall are at substantially the same height as the low height horizontal upper edges of the entire low height peripheral side wall. In addition, the each partition wall of the cover comprises a high level middle wall portion comprising a high level horizontal lower edge, two low height end wall portions positioned at either end of the high level middle wall portion, and at least one slanted wall portion. The two low height end wall portions comprise low height horizontal lower edges. The at least one slanted wall portion comprises slanted edges connecting the high level horizontal edge of the high level middle wall portion with the low height horizontal edge of one of the two low height end wall portions of one of the partition walls. In this embodiment the entire downwardly extending peripheral side wall of the cover comprises a low height horizontal lower edge adapted to abut the low height upper edge of the peripheral side wall of the battery container.

In still another embodiment the height of each intercell connecting conductor comprises the distance from the strap to the opening in the partition wall. Also, at least one of the intercell connecting conductors is of reduced height. In these embodiments the interconnected negative and positive straps from adjacent cells are aligned with each other. The horizontal base of the intercell connecting conductor in the cell housing a negative strap is connected to the negative strap and the horizontal base of the intercell connecting conductor in the cell housing the positive plates are connected to the positive strap. The ears of the intercell connecting conductors in adjacent cells extend obliquely upward from the horizontal base to which the ears are attached so that the ears are vertically unaligned with the base to which said ears are attached. In addition, the ears from adjacent cells face each other through the opening, and the ears from adjacent cells are attached to each other through the opening by a welding comprising an electric weld.

In still another embodiment at least one of the terminal posts is of reduced height. In this embodiment the top wall of the cover comprises an upper portion and a lower portion. The upper portion is higher than the lower portion, and the lower portion surrounds at least one of the terminal posts. The height of the at least one terminal post is less than the height of the upper portion of the upper surface.

In another embodiment the height of at least one of the terminal posts comprises the distance between one of the straps and one of the terminal settling holes of the top wall of the battery cover. In this embodiment the height of at least one of the terminal posts is of reduced height. In this embodiment also the container further comprises portions of low height surrounding the negative and positive terminal posts. The low height portions comprise horizontal upper edges that are positioned lower than the upper horizontal edge of that portion of the partition wall separating the at least two cells positioned directly above the opening. In addition, the positive and negative terminal settling surface regions of the top surface of the cover are lower in height than the horizontal upper edge of that portion of the partition wall separating the at least two cells positioned directly above the opening when the cover is attached to the battery container.

The container in this embodiment further comprises low height wall portions comprising horizontal upper edges of lower height than that portion of the at least one partition wall above the opening, and downwardly extending portions of low height surrounding the positive and negative terminal posts when the cover is attached to the battery container. The low height portions of the cover comprise low height horizontal lower edges and the low height horizontal lower edges of the low height portions of the cover abut and are hermetically sealed to the horizontal upper edges of the low height portions of the battery container.

In still another embodiment the height of at least one of the following elements is less than 16 mm: the positive terminal post, the negative terminal post, and the intercell connecting conductor. The height of the positive and negative terminal posts comprises the distance from the top of the positive and negative straps to the top of the positive and negative terminal posts, respectively, and the height of the intercell connecting conductor comprises the distance between the top of one of the positive and negative straps and the top of the intercell connecting conductor. In addition, the height of each of the following elements can be less than 37 mm: the positive terminal post, the negative terminal post, and the intercell connecting conductor.

In still another embodiment the invention relates to a storage battery comprising at least adjacent two cells, and intercell connecting conductor means. Each of the cells comprises a plurality of negative plates, a negative strap interconnecting the negative plates, a plurality of positive plates and a positive strap interconnecting the positive plates. The intercell connecting conductor means connects a negative strap and a positive strap from adjacent cells. The intercell connecting conductor means comprises a horizontal base attached to at least one of the straps and an ear extending obliquely upwardly and laterally away from the base so as to be vertically offset from the base.

In this embodiment the intercell connecting conductor means comprises two intercell connecting conductors. The bases of each of the two intercell connecting conductors are connected to a different strap of opposite potential in adjacent cells. In this embodiment the battery further comprises a battery container comprising an interior comprising said at least two adjacent cells, and at least one partition wall partitioning the interior of the container into at least two adjacent cell chambers each housing one of the at least two adjacent cells. The at least one partition wall has an opening therein, and each ear extends upwardly to face the opening. The opening is vertically offset from the horizontal base, and the ears are connected through the opening.

The at least one partition wall in this embodiment comprises a horizontal upper edge directly above the opening, and the battery can further comprise a negative terminal, a positive terminal, and a wall. The negative terminal is formed from one of the negative straps and the negative terminal comprises a negative terminal post extending upwardly from one of said negative straps. The positive terminal is formed from one of the positive straps, and the positive terminal comprises a positive terminal post extending upwardly from one of the positive straps. A portion of the wall at least partially surrounds at least one of the terminal posts and is lower in height than the horizontal upper edge of the at least one partition wall directly above the opening.

The battery in this embodiment further comprises a cover for covering the container. The cover comprises a top wall having positive and negative terminal settling openings adapted to receive, respectively, the positive and negative terminal posts therethrough. The top wall further comprises positive and negative terminal settling surface regions surrounding the positive and negative terminal settling openings, respectively. The positive and negative terminal posts from positive and negative terminals, respectively, on the positive and negative terminal settling surface regions of the top wall. The positive and negative settling surface regions are lower than the horizontal upper edge of the at least one partition wall of the container directly above the opening.

In still another embodiment the invention relates to a storage battery comprising a container, at least one partition wall, at least two adjacent cells, and intercell connecting conductor means. The container comprising an interior. The at least one partition wall partitions the interior of the container into at least two adjacent cell chambers. The at least one partition wall has an opening therein. In addition, each of the at least two adjacent cells is positioned in one of said two adjacent chambers. Each of the cells comprises a plurality of negative plates, a negative strap interconnecting the negative plates, a plurality of positive plates, and a positive strap interconnecting the positive plates. The intercell connecting conductor means connects a negative strap and a positive strap from adjacent cells. The intercell connecting conductor means comprises a horizontal base attached to at least one of the straps. The opening in the at least one partition wall is offset vertically from the horizontal base.

The intercell connecting conductor means comprises two intercell connecting conductors. The bases of each intercell connecting conductor are connected to a different strap of opposite potential in an adjacent cell. Each intercell connecting conductor comprises an ear extending upwardly from the base and the two ears are connected through the opening.

In still another embodiment the invention relates to an intercell connecting conductor for connecting a negative strap and a positive strap from adjacent cells in a storage battery comprising at least one partition wall having an opening therein through which the negative strap and the positive strap are connected. The conductor comprises a horizontal base adapted to be connected to a strap in a cell adjacent to another cell having a strap of opposite potential therein, and an ear extending obliquely upwardly from the base so that the ear is vertically offset from the horizontal base.

In still another embodiment the invention relates to a storage battery comprising a container, at least one partition wall, at least two adjacent cells, negative and positive terminals, and a wall. The container comprises an interior and the at least one partition wall partitions the interior of the container into at least two adjacent cell chambers. The at least one partition wall has an opening therein and comprises a horizontal upper edge directly above the opening. Each of the at least two adjacent cells is positioned in one of the two adjacent chambers. The negative terminal comprises a negative terminal post extending upwardly from one of said cells, and the positive terminal comprises a positive terminal post extending upwardly from the other of the cells. A portion of the wall at least partially surrounds at least one of the terminal posts and is lower in height than the horizontal upper edge of the at least one partition wall directly above the opening.

In this embodiment the battery further comprises a battery cover for covering the container. The cover comprises a top wall having positive and negative terminal settling openings adapted to receive, respectively, the positive and negative terminal posts therethrough. The top wall further comprises positive and negative terminal settling surface regions surrounding the positive and negative terminal settling openings, respectively. The positive and negative terminal posts form positive and negative terminals, respectively, on the positive and negative terminal settling surface regions of the top wall. At least one of the positive and negative terminal settling surface regions is lower than the upper horizontal surface of the at least one partition directly above the opening when the cover is attached to the container.

In still another embodiment the invention relates to a battery cover for a battery container comprising at least one partition wall partitioning the interior of the container into at least two adjacent cell chambers. The at least one partition wall has an opening therein and comprises a horizontal upper edge directly above the opening. The container further comprises at least two adjacent cells, and negative and positive terminals. The at least two adjacent cells are each positioned in one of the two adjacent chambers. The positive and negative terminals each comprise a positive and negative terminal post, respectively, extending upwardly from different cells. The cover comprises a top wall having positive and negative terminal settling openings adapted to receive, respectively, the positive negative terminal posts therethrough. The top wall further comprises positive and negative terminal settling surface regions surrounding the positive and negative terminal settling openings, respectively. The positive and negative terminal posts form positive and negative terminals, respectively, on the positive and negative terminal settling surface regions of the top wall. The at least one of the positive and negative terminal settling surface regions is lower than the upper horizontal surface of the at least one partition directly above the opening when the cover is attached to the top portion of the container.

The cover can further comprise at least two peripheral side walls extending downwardly from the top wall. The side walls are adapted to abut and to be hermetically sealed to peripheral side walls of the battery container. The at least one partition wall extends downwardly from the top wall. The at least one partition wall of the cover is adapted to abut and to be hermetically sealed to the at least one partition wall of the battery container The cover further comprises two low height portions extending downwardly from the top wall. Each low height portion surrounds one of the negative and positive terminal posts when the cover is attached to the top portion of the container. The two downwardly extending low height portions each comprise a substantially L-shaped corner of one of the peripheral side walls of the cover. The substantially L-shaped corner comprises a substantially L-shaped low height horizontal edge. In addition, the cover further comprises a high level downwardly extending wall portion comprising a high level horizontal lower edge. The high level horizontal lower edge is higher than the substantially L-shaped low height horizontal edge. Finally, the cover further comprises a plurality of slanted wall portions extending downwardly from the top wall. The plurality of slanted wall portions comprises slanted lower edges. At least one of the slanted lower edges comprises a slanted lower edge positioned between one of the substantially L-shaped low height horizontal edges of the low height downwardly extending wall portions and the high level horizontal lower edge of the high level downwardly extending wall portion of the cover.

BRIEF DESCRIPTION OF THE DRAWINGS

The present invention will be better understood with reference to the detailed description which follows in conjunction with the attached drawings in which:

FIG. 1 is a top plan view partially cut-away, of a conventional storage battery;

FIG. 2 is a cross-sectional view taken along line II—II in FIG. 1;

FIGS. 3-6 show a first embodiment of the present invention;

FIG. 3 is a top plan view, partially cut-away, of a storage battery of the present invention;

FIG. 4 is a cross-sectional view taken along line IV—IV in FIG. 3;

FIG. 5 is a cross-sectional view taken along line V—V in FIG. 3;

FIG. 6 is a cross-sectional view taken along line VI—VI in FIG. 3;

FIG. 7 is a top plan view of another embodiment of the storage battery of the present invention;

FIG. 8 is a cross-sectional view taken along line VIII—VIII in FIG. 7;

FIG. 9 is a cross-sectional view taken along line IX—IX in FIG. 7;

FIG. 10 is a perspective view of a battery container of the storage battery shown in FIG. 7;

FIG. 11 is a perspective view of a particular portion of the storage battery illustrated in FIG. 7;

FIG. 12 is a perspective view of the battery cover which is turned upside down, of the storage battery of the invention illustrated in FIG. 7;

FIG. 13 is a top plan view of another embodiment of the storage battery of the present invention;

FIG. 14 is a cross-sectional view taken along line XIV—XIV in FIG. 13;

FIG. 15 is a cross-sectional view taken along line XV—XV in FIG. 13;

FIG. 16 is a perspective view of the battery container of the storage battery illustrated in FIG. 13 of the present invention;

FIG. 17 is perspective view of the battery cover turned upside down, of the storage battery illustrated in FIG. 13;

FIG. 18 is a perspective view of another embodiment of the present invention;

FIG. 19 illustrates a perspective view of the present invention in which the internal cell assemblies are omitted; and FIG. 20 is a perspective view of the battery cover of the present invention illustrated in FIG. 18, in an upside-down position.

DETAILED DESCRIPTION OF PREFERRED EMBODIMENTS

Figure 3:
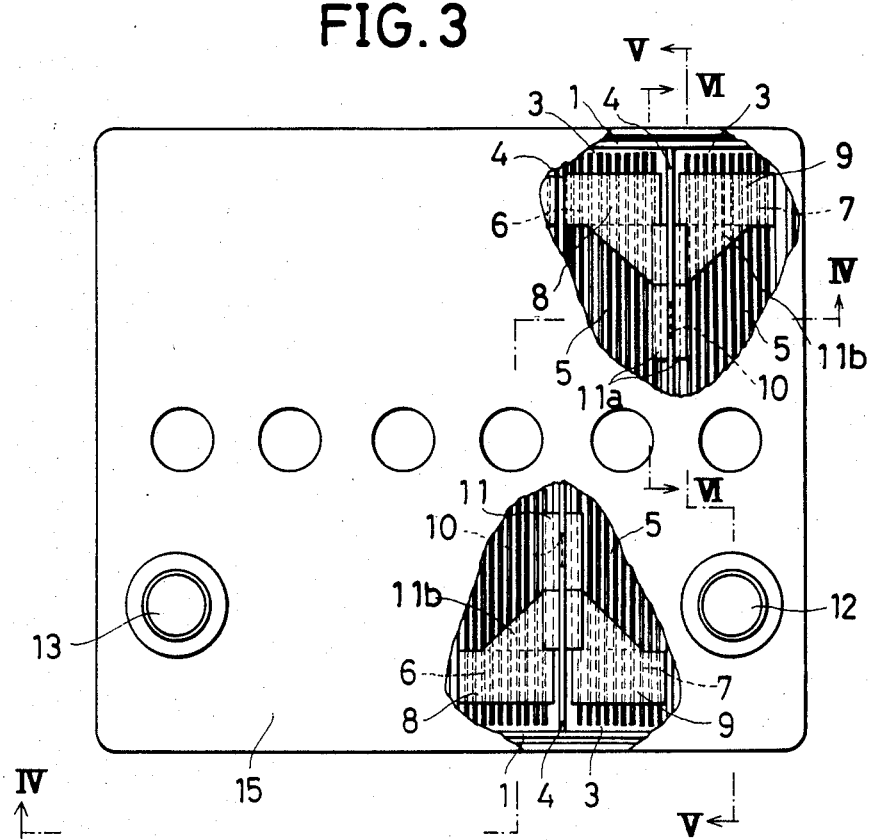
Figure 6:
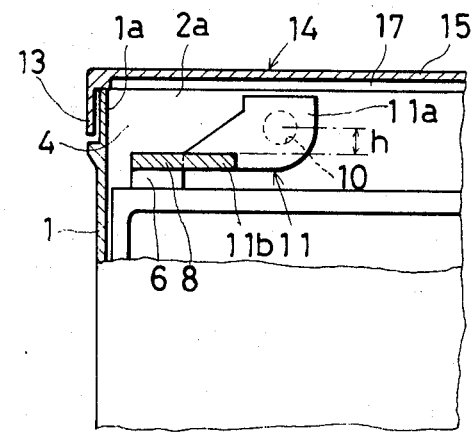
Figure 7:
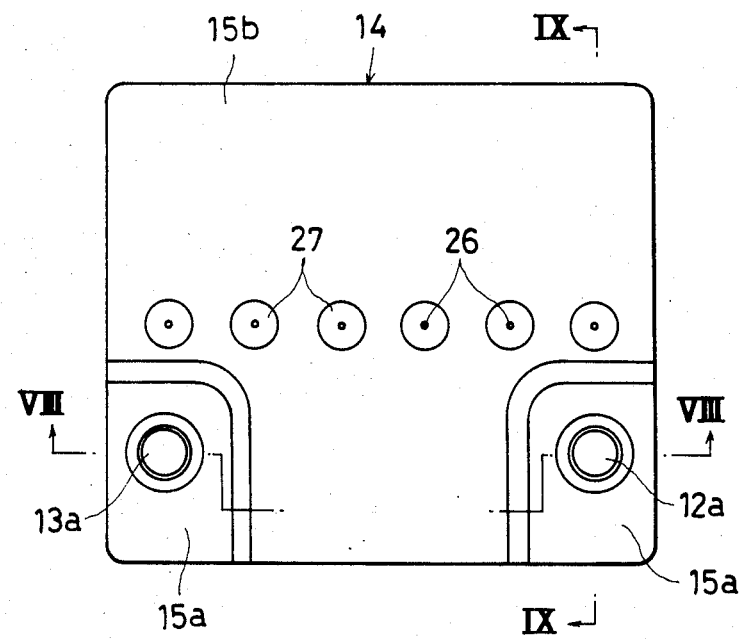
FIGS. 7-12 show another embodiment of the present invention.
Figure 10:
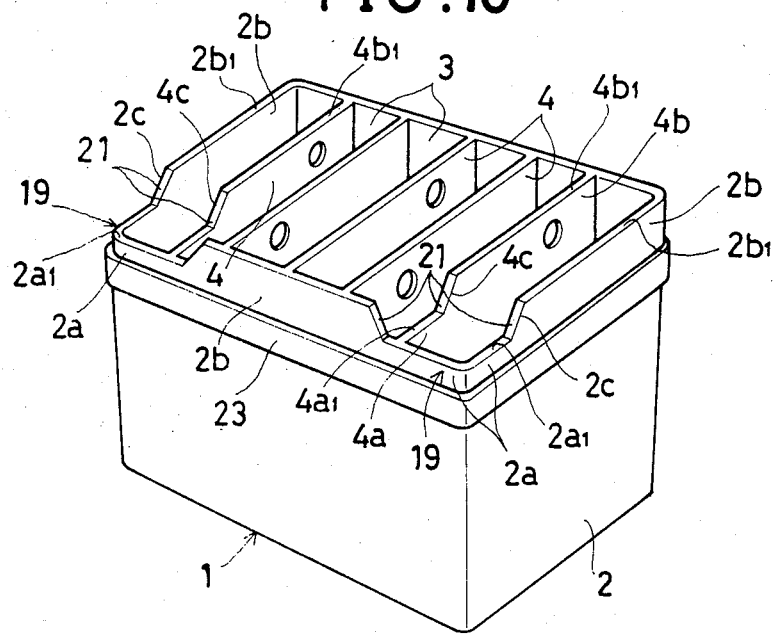
Figure 8:
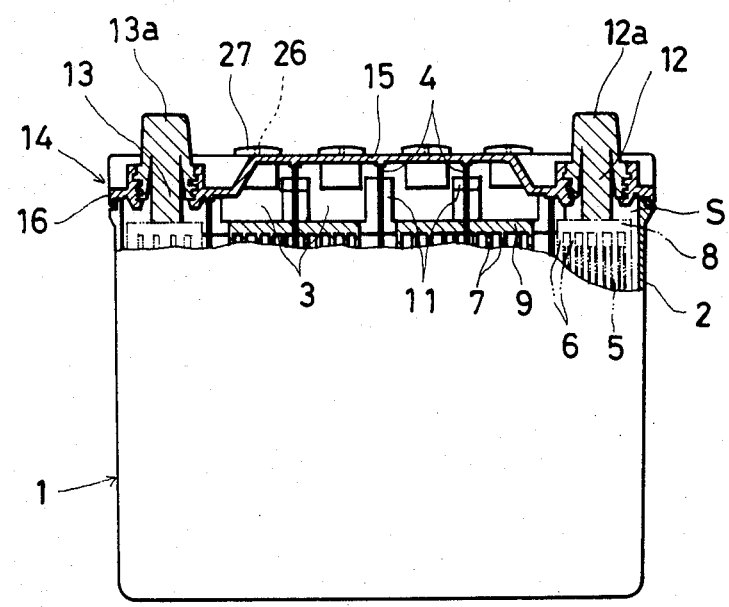

The present invention comprises a storage battery comprising a battery container partitioned into a plurality of cells by a plurality of partition walls. Each cell comprises a plurality of negative and positive plates, and a plurality of tabs extending from the upper edges of the negative and positive plates. The tabs attached to the negative plates form one row of tabs and the tabs attached to the positive plates form another row of tabs. Each cell also has a negative strap interconnecting the row of tabs which protrude from the upper edges of the negative plates, and each cell has a positive strap interconnecting a row of tabs protruding from the upper edges of the positive plates. Positive and negative straps from adjacent cell chambers are interconnected through intercell connecting conductors which pass through a perforation hole in the partition wall which separates the adjacent cell chambers. Each intercell connecting conductor comprises a horizontal base portion and an ear portion extending upwardly from the horizontal base portion so as to face the perforation hole in the partition wall.

In addition, one of the negative straps and one of the positive straps are used as the negative terminal and the positive terminal, respectively, of the battery. The negative strap which is used for the negative terminal is provided with a negative terminal post extending upwardly from the negative strap. Similarly, the positive strap used for the positive terminal is provided with a positive terminal post extending upwardly from the positive strap.

Also provided is a box-like battery cover. The cover comprises a top wall, a downwardly extending peripheral side wall extending downwardly from a periphery of the top wall, and downwardly extending partition walls which partition the inside of the battery cover. The cover is attached to the container so that the downwardly extending peripheral side wall and the downwardly extending partition walls abut and are hermetically attached to a peripheral side wall and the partition walls, respectively, of the battery container. In addition, the top wall of the cover comprises positive and negative terminal settling holes through which the negative and positive terminals of the battery container are adapted to extend when the cover is attached to the container. In addition, the top wall comprises positive and negative terminal settling surface regions which surround the positive and negative terminal settling holes in the top wall. As a result, the positive and negative terminal posts form, respectively, positive and negative terminals, on these terminal settling surface regions of the top surface. In addition, the present invention forms at least one of the following raised or vertically extending electrical conductors with a reduced height: the negative terminal post, the positive terminal post, and the intercell connecting conductor.

In one embodiment, the raised conductor that is of a reduced height is the intercell connecting conductor which extends upwardly from one of the negative or positive straps to the perforation hole in the partition wall. In another embodiment, the raised conductor that is of a reduced height is the terminal post which extends upwardly from one of the straps to the terminal settling hole of the top wall of the battery cover.

According to another aspect of the invention, the present invention is an improvement upon conventional storage batteries in that the negtive strap of one cell on one side of a partition wall, and the positive strap of an adjacent cell on the other side of the partition wall are arranged in a straight line through the partition wall, and the perforation hole in the partition wall is offset in the lateral direction from a position directly above and in vertical alignment with the horizontal base of each intercell connecting conductor (each horizontal base being connected to either a negative strap of the cell on one side of the partition wall or a positive strap of the cell on the other side of the partition wall). In addition, the present invention is an improvement over conventional storage batteries in that the aligned negative and positive straps in adjacent cells are interconnected by ear portions which extend upwardly from but which are vertically offset with respect to the base portions of the intercell connecting conductors in such a manner so that these ears from adjacent cells face each other through the perforation hole in the partition wall so that these ears can be connected by electrical welding. Further, the ears, because they are offset from rather than extending directly vertically upwardly from the base portions, extend obliquely with respect to a vertical axis, from the base portions of the intercell connecting conductors.

According to another aspect of the present invention, the present invention is an improvement over conventional storage batteries in that the portions of the wall of the battery container surrounding the negative and positive terminal posts have a low height such that the horizontal upper edges of the walls surrounding the negative and positive terminal posts are lower in height than the horizontal upper edges of the partition walls of the container that are located directly above the perforation holes in the partition walls. Further, the negative and positive terminal settling surface regions on the top wall of the battery cover are lowered, compared to the rest of the top wall, by an amount corresponding to the difference in height between the low height portions of the battery container and the upper edge of the partition walls above the perforation hole. As a result, when the battery cover is attached to the battery container, the low height horizontal, negative and positive terminal settling surface regions of the top wall of the cover are positioned so as to be at a lower level than the horizontal upper edge of that portion of the partition wall directly above the perforation wall.

FIGS. 3–6 illustrate a first embodiment of the storage battery of the present invention in which the height of the intercell connecting conductor from the strap to the perforation hole in the partition wall of the battery is of reduced height, which facilitates the welding of the intercell connecting conductors by a welding machine such as a welding gun without contact between the welding gun and the horizontal base of the intercell connecting conductor. As a result, the vertical position of the perforation hole in the partition walls can be lowered, as can the height of the partition wall itself, which results in lowering the height of the storage battery.

Referring to FIGS. 3–6, the storage battery comprises a square battery container 1 composed of a thermoplastic synthetic resin. Container 1 comprises a peripheral side wall 2 and a plurality of partition walls 4 which partition the interior of battery container 1 to form six cell chambers 3, each of which contain a cell or electrode plate assembly 5. Each cell 5 comprises negative electrode plates, positive electrode plates, and separators interposed between adjacent negative and positive electrode plates. Each cell also comprises negative tabs 6 and positive tabs 7 which project upwardly from the upper edges of the negative and positive plates, respectively, on both lateral sides of the upper surface of each of the cells. Negative tabs 6 and positive tabs 7 are arranged in a row on the right side, and the left side, respectively, of the battery, when viewed in FIG. 4. Each cell further comprises a negative strap 8 and a positive strap 9. Negative strap 8 interconnects the negative tabs 6 and positive strap 9 interconnects positive tabs 7. Straps 8 and 9 in adjacent cells on either side of a partition wall 4 are aligned with each other. Furthermore, one end of straps 8 and 9 in adjacent cells are positioned on either side of partition wall 4 and are attached to each other in a manner which will be described below.

For the sake of convenience and clarity in explaining the structure and operation of the present invention, the discussion below will describe the manner of connecting only one pair of negative and positive straps in adjacent cells. However, it should be understood, that this method described below of connecting this one pair of straps and the structure used to connect the one pair of straps described below can be used for each pair of straps and intercell connecting conductors in the present invention.

Straps of opposite potential from adjacent cells are connected by intercell connecting conductors 11, 11. Intercell connecting conductors from adjacent cells comprise substantially plate-shaped conductive horizontal base members 11b, 11b which are connected respectively, to negative strap 8 and positive strap 9 on either side of partition wall 4 so that these base members project horizontally and laterally, for example, inwardly, from the inner side of each of straps 8 and 9. In addition, a perforation hole 10 is positioned in wall 4 so that this hole 10 is offset laterally and inwardly from the forward end of each horizontal base member 11b. For example hole 10 can be 10 mm laterally from the edge of base 11b, and 6 mm vertically above base 11b. As a result, hole 10 is vertically unaligned with adjacent base members 11b, 11b in the vertical direction. In addition, adjacent intercell connecting conductors also comprise substantially plate-shaped ear members 11a, 11a, the lower ends of which are connected to their respective conductive base members 11b, 11b. Further, each ear member 11a extends inwardly and upwardly, but obliquely, along and close to either side of partition wall 4 so that these two ears 11a, 11a extend substantially to hole 10 and face each other through perforation hole 10. Thus, ears 11a have a height of 20 mm. As a result, intercell connecting conductors 11, 11 in adjacent cells can be welded to each other using the forward end of an electric welding gun in an ordinary manner in comprising pressing conductors 11, 11 from the outside so that they are brought together and welding ears 11a, 11a together through perforation hole 10 by electric welding. At the same time the intercell connecting conductors are attached hermetically to the peripheral edges of partition wall 4 that surround perforation hole 10.

Because ears 11a, 11a do not extend directly vertically above horizontal bases 11b, 11b, the forward end of the welding gun never abuts the upper surface of bases 11b, 11b and consequently a smoother and good welding can be obtained for interconnecting adjacent cells 5, 5 through intercell connecting conductors 11, 11. In addition, because perforation hole 10 is not aligned vertically directly above base members 11b, 11b, but is offset laterally therefrom, the distance between perforation hole 10 and base member 11b can be shortened, thereby permitting the height of partition wall 4 to be lowered by this same amount, and thereby resulting in a storage battery of lower height than conventional storage batteries.

In addition, the storage battery of the present invention further comprises a negative terminal post 12, a positive terminal post 13, and a square box-shaped battery cover 14. Cover 14 comprises a flat top wall 15, a downwardly extending peripheral side wall 16, and short downwardly extending partition walls 17 extending downwardly fromt he rear surface of top wall 15. Battery cover 14 is fused to battery container 1 by heating so that battery cover 14 is hermetically attached to battery container 1. This is accomplished by a conventinal process. When this process is performed, the upper horizontal edge of peripheral side wall 2 of container 1 and the partition walls 14 are fused, respectively, to the lower edges of the downwardly extending peripheral side wall 16 and the downwardly extending partition wall 17 of battery cover 14. In addition, horizontal base member 11b and ear 11a are preferably integrally molded to form intercell connecting conductor 11.

To briefly summarize, the battery of the present invention comprises a negative strap and a positive strap in adjacent cells that are interconnected by intercell connecting conductors through a perforation hole formed in a partition wall between adjacent cells. Further, the perforation hole is offset laterally from the forward ends of the intercell connecting conductors which are connected to the positive and negative straps so as to be unaligned therewith. In addition, the ears of the intercell connecting conductors extend from the horizontal base of the conductors upwardly and obliquely so as to extend to the perforation hole. As a result, when the two ears on either side of a partition wall are interconnected through the partition hole by use of an electric gun or any other welding means, the forward portion of the welding means can never be brought into contact with the horizontal bases of the intercell connecting conductors so that an excellent and sufficient interconnecting of straps of opposite potentials from adjacent cells can be achieved.

If desired, when the position of the perforation hole is lowered, the height of the partion wall can be lowered by this same amount so as to produce a storage battery which is shorter in height than conventional storage batteries.

FIGS. 7-12 show another embodiment of the present invention in which the distance between each of the negative and positive terminal settling surface regions of the top wall of the battery cover and each of the negative and positive terminal straps, respectively, is shortened compared to conventional storage batteries, and the height of the negative and positive terminal posts (from the negative and positive straps, respectively, to their respective terminal settling hole in the top wall of the battery cover) is also shortened.

The storage battery to which this embodiment of the present invention is applied is the same monoblock-type storage battery illustrated in the first embodiment illustrated in FIGS. 3-6. Such a battery comprises a square battery container 1 composed of thermoplastic synthetic resin, such as polypropylene, etc. Container 1 comprises six cells 5 which are connected in series. Also provided is a negative terminal post 12 and a positive terminal post 13 located on the same side of container 1 in different cell chambers 3, 3. Also provided is a box-like battery cover 14 which is also composed of a thermoplastic synthetic resin such as polypropylene, etc.

Cover 14 and container 1 are heat sealed to each other and are constructed as described below.

Figure 9:
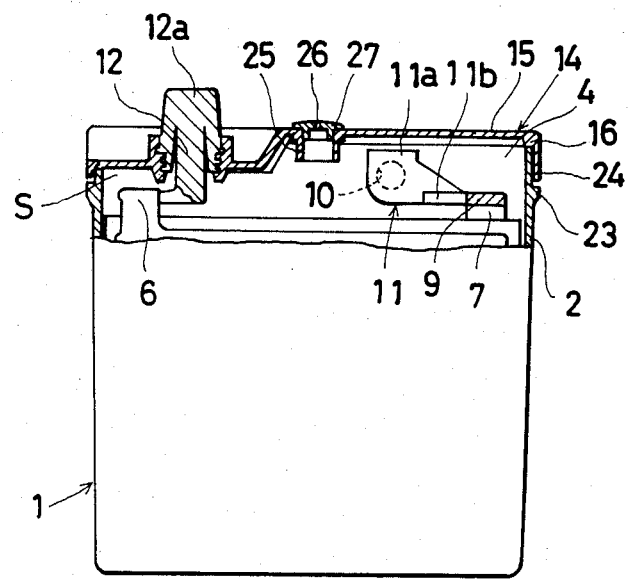
Figure 12:
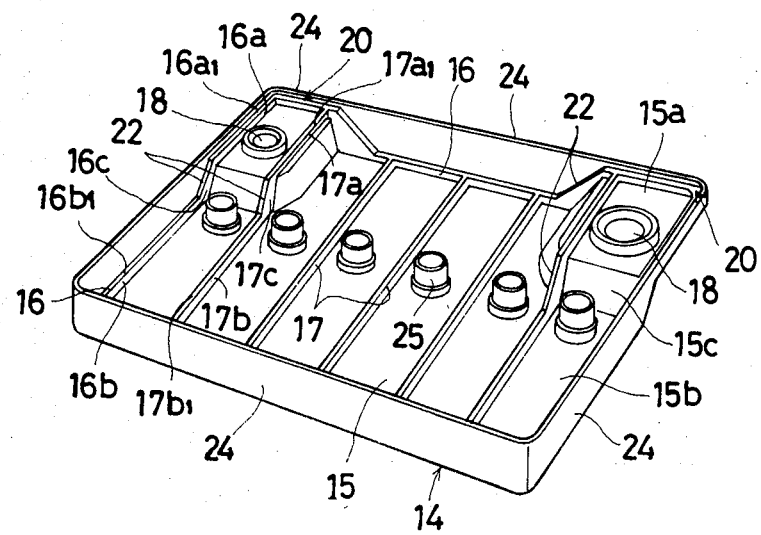
Figure 14:
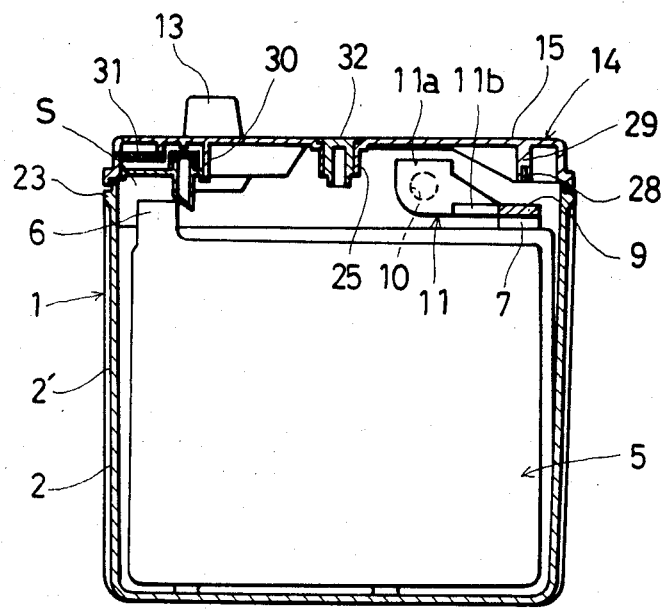
FIGS. 13-17 show another embodiment of the present invention.
Figure 15:
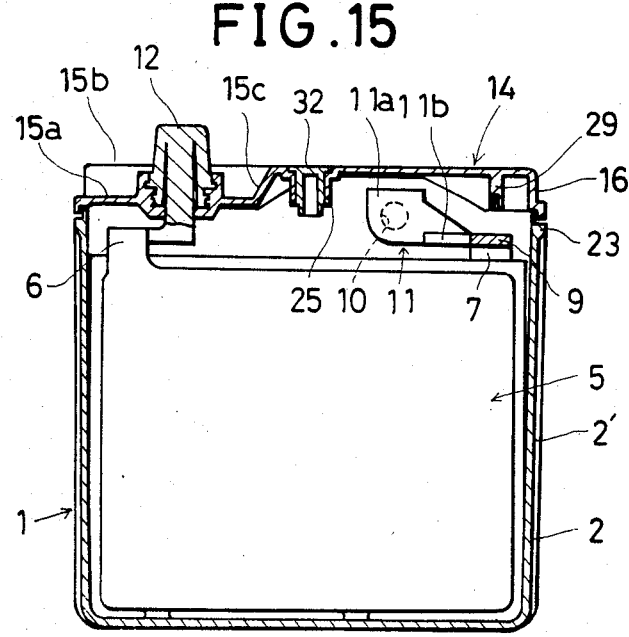
Figure 13:
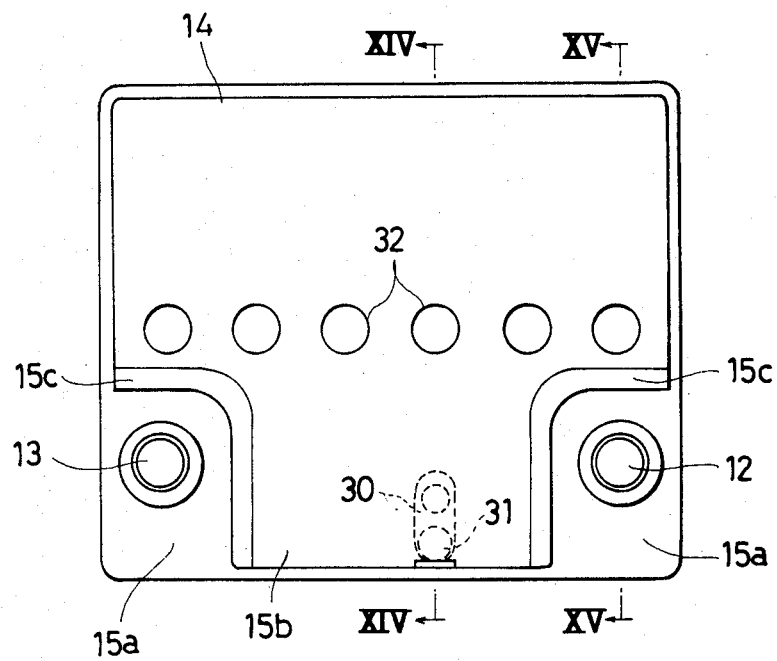
Figure 16:
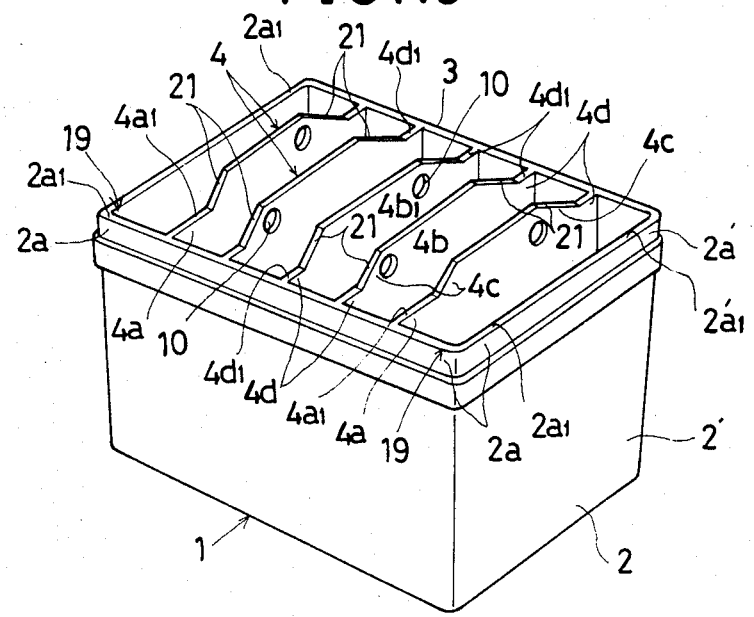

The storage battery illustrated in FIGS. 7-12 comprises a dead space S, seen in FIG. 9, between top wall 15 (and more particularly negative and positive terminal settling surface regions 15a, 15a of top wall 15) and negative and positive terminal straps 8, 9 located therebelow in battery container 1. In the present invention, dead space S is shortened to a height of 7-9 mm, as is the length of each negative and positive terminal post 12, 13 which is 9-11 mm, from the strap to which the posts are attached to their respective surface regions 15a, 15a. The resulting storage battery is economical to manufacture and has a comparatively high output compared to conventional storage batteries.

In order to produce such a battery, the portions of the walls of container 1 surrounding negative terminal post 12 and positive terminal post 13 comprise low height wall portions 19 having horizontal upper edges which are lower in height than horizontal upper edge $4b_1$ of partition wall 4 comprising perforation hole 10. In the storage battery illustrated in FIGS. 7-12, in which the negative terminal post 12 and positive terminal post 13 are disposed in different cell chambers 3, 3 located at opposite ends of the battery, and more specifically in opposite corners of battery container 1, the above-mentioned low-height wall portions 19 are each formed so as to have a ]-shape. These ]-shaped wall portions 19 comprise a generally L-shaped corner wall portion 2a of square peripheral side wall 2 of battery container 1, and end wall portion 4a of the partition wall 4 located nearest to the L-shaped corner wall portion 2a. As a result, battery container 1 comprises low-height wall portions 19, 19 surrounding, respectively, negative and positive terminal posts 12, and 13 on two corners of container 1.

Figure 11:
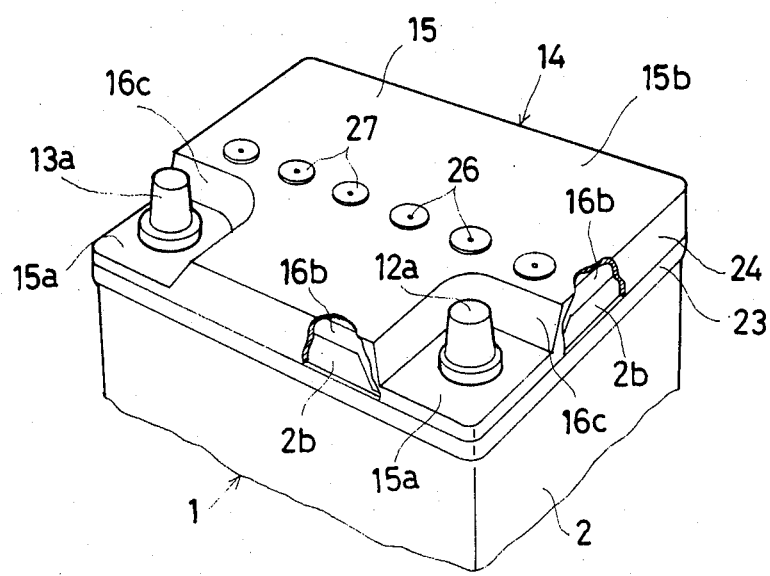

Battery cover 14 further comprises a top wall 15, two corners of which comprise, respectively, negative and positive terminal settling wall surface regions 15a, 15a which surround holes 18, 18 through which terminal posts 12, and 13 are adapted to extend. These regions 15a, 15a in top wall 15 of battery cover 14 are lower in height than the rest of top wall 15 by 7-9 mm. Further, the shape of the regions 15a, 15a of battery cover 14, and the difference in height between this region and the rest of top wall 15 corresponds to the shape above-mentioned ]-shaped low-height wall portions 19, 19 formed on one side of battery container 1, and the difference in height between portions 19 and $4b_1$. As a result, regions 15a, 15a in top wall 15 of container 14 are flat, horizontal, and at a lower level than the rest of top wall 15 of cover 14 when cover 14 is placed on top of container 1 as seen in FIG. 11. In addition, battery cover 14 further comprises wall portions that are adapted to face the above-mentioned ]-shaped wall portions 19, 19 of battery container 1 when cover 14 is attached to container 1. These wall portions of battery cover 14 extend downwardly to form respective ]-shaped low-height downwardly projecting wall portions 20, 20 having a lower height than the rest of top wall 15. Wall portions 20, 20 comprise, respectively, on either side of cover 14, low-height downwardly extending corner wall portions 16a, 16a having low-height horizontal lower edges $16a_1$, $16a_1$, and low-height downwardly extending partition wall portions 17a, 17a which comprise low-height horizontal lower edges $17a_1$, $17a_1$. When battery cover 14 is attached to battery container 1, low-height horizontal lower edges $16a_1$, $16a_1$ and low-height horizontal lower edges $17a_1$, $17a_1$ of the ]-shaped low-height downwardly extending wall portions 20, 20 abut the ]-shaped upper edges $2a_1$, $2a_1$, and $4a_1$, and $4a_1$ of the ]-shaped low-height wall portions 19, 19 of battery container 1 at a lower level than the high-height horizontal upper edges $4b_1$ of partition walls 4 of the battery container. These low-height wall portions 20, 20 of cover 14 are formed by lowering the generally L-shaped corner wall portions on one side of the downwardly extending peripheral side walls of a conventional battery and by lowering the end wall portion of the respective downwardly extending partition walls of a conventional battery which are located nearest these L-shaped corners.

When battery cover 14 is attached to battery container 1, the ]-shaped low-height downwardly extending wall portions 20, 20 of cover 14 are brought into contact with the ]-shaped low-height wall portions 19, 19 of battery container 1, and are fused together by heating. Consequently, the low-height wall surface regions 15a, 15a of battery cover 14 are positioned lower than the high, horizontal upper edges $4b_1$ of the high wall portions 4b of partition wall 4 of the battery container. As a result, the vertical extent of dead space S between the upper surface of cells 5 and each of the terminal settling surface regions 15a, 15a of battery cover 14 is lessened, and the height of negative and positive terminal posts 12 and 13 (i.e., the distance between their respective straps 8, 9 and their respective terminal settling holes 18, 18) is shortened so that terminal posts that are shorter by this amount can be used. Consequently, less cast lead is used to manufacture the positive and negative terminals, and the electrical resistance of these terminals is decreased, thereby increasing the output and diminishing the cost of the storage battery.

In general, holes 18, 18 can be located at approximately or almost the same vertical level as perforation holes 10 of partition wall 4. Alternatively, holes 18, 18 can be positioned so that they are lower than perforation holes 10. Further, perforation holes 10 can be positioned in partition wall 4 so that holes 10 are vertically aligned with and positioned directly above horizontal base 11b of the intercell connecting conductor 11, or alternatively and preferably, perforation holes 10 are offset laterally from horizontal base 11b so as to be unaligned therewith in the vertical direction, thereby resulting in the advantages discussed above with respect to FIGS. 3–6.

That portion of terminals 12 and 13 that extend above holes 18, 18 are denoted as negative terminal 12a and positive terminal 13a, respectively. These terminals extend beyond low-height wall surface regions 15a, 15a.

In order to effect a good and reliable heat seal between battery container 1 and battery cover 14 when they are fused together by heating under pressure, the following structure can be used. Battery container 1 further comprises a slanted peripheral side wall portion 2c and a slanted partition wall portion 4c, each of which comprises, respectively, slanted upper edges 21, 21 connecting the ]-shaped low-height horizontal upper edges of wall portions 19 to the high, horizontal upper edges $2b_1$ and $4b_1$, respectively. Horizontal upper edge $4b_1$ is located above the perforation hole 10 which is formed in the high-level wall portion 4b of partition wall 4.

Battery cover 14 comprises corresponding slanted portions which are adapted to engage and to be heat sealed to these slanted portions 2c and 4c of container 1. More specifically, cover 14 further comprises a slanted downwardly extending peripheral side wall portion 16c and a slanted downwardly extending partition wall portion 17c which comprise respectively, slanted lower edges 22, 22. These two slanted portions of cover 14 face slanted portions 2c and 4c, respectively, of the container when cover 14 is attached to container 1. In addition, slanted wall portion 16c connects low-height, L-shaped corner portion 16a with the high-level horizontal lower edge $16b_1$ of the high, downwardly extending peripheral side wall 16b. In addition, slanted portion 17c connects the low-height, downwardly extending partition wall 17a with the high, horizontal, lower edge $17b_1$ of high, downwardly extending partition wall portion 17b. As a result, these two slanted portions 17c and 16c are formed between the ]-shaped low-height horizontal lower edges of each of the respective ]-shaped low-height downwardly extending wall portions 20, 20, and the high walls 16b and 17b. Further, top wall 15 of battery cover 14 further comprises slanted wall surface regions 15c, 15c, each on opposite top sides of the battery. Each region 15c extends between and over slanted portions 16c and 17c, and also extends between the low-height horizontal terminal settling wall regions 15a, 15a and the high-level wall surface regions 15b. In addition, the high-level downwardly extending partition walls 17b are adapted to abut the high-level horizontal upper edges $4b_1$ of the high-level partition walls 4b of the battery container.

As a result of this construction, when battery container 1 and battery cover 14 are fused under pressure a strong connection is effected between these the slanted upper edge 21 and the slanted lower edge 22 of container 1 and cover 14, respectively. In addition, a strong connection is forged between the low-height and high-level horizontal upper and lower edges of the container and the cover so that a good and reliable heat-sealed storage battery is obtained. The slanted upper edges and slanted lower edges of the battery can be formed at the time of molding of battery container 1 and battery cover 14. Alternatively, these slanted upper and lower edges may also be formed at the time that battery container 1 and cover 14 are fused together under heat and pressure. This is accomplished by applying a heating plate having slanted surfaces to the upper surface of battery container 1 and to the lower surface of battery cover 14 to form the slanted upper and lower edges. In order to be effective, the inclination of the slanted upper edge or the slanted lower edge should be no greater than 85° with respect to a horizontal plane. In addition, it is within the scope of the invention to use a straight, a stepped, a curved, or other shape for these slanted upper and lower edges. Also, the slanted edges of cover 14 and container 1 can have the same angle of inclination.

In addition, container 1 further comprises an annular rib 23 for protecting the container. Rib 23 can be integrally molded with container 1 and projects over the entire periphery of the upper portion of peripheral side wall 2 of container 1. Similarly, a downwardly extending protecting outer wall 24 is integrally molded around the entire outside of the periphery of the downwardly extending peripheral side wall 16 of cover 14. This wall 24 extends downwardly beyond the lower end of the downwardly extending peripheral side wall 16 and faces annular rib 23 of container 1. As a result, the heat-sealed region formed between the upper edge of peripheral side wall 2 of container 1 and the lower edge of the downwardly extending peripheral side wall 16 of cover 14 can be protected and covered by outer wall 24 which results in a storage battery having an excellent appearance.

The storage battery further comprises a tubular filling opening 25 for each cell chamber. Opening 25 is located in the middle region of each cell in top wall 15 of battery cover 14. Also provided is a filling plug 27 having a vent opening 26 in the center thereof. The resulting storage battery is an open-type storage battery.

FIGS. 13–17 illustrate still another embodiment of the present invention. In this embodiment, the basic construction of the storage battery is the same as that in the previous embodiments and similar reference numerals are used to refer to similar elements of the invention. Thus, the invention illustrated in FIGS. 13–17 comprises a battery container 1 comprising ]-shaped low-height wall portions 19, 19 on opposite sides and corners of the battery. These wall portions 19, 19 each enclose one of negative or positive terminal posts 12, 13. In addition, the invention further comprises a battery cover 14 comprising low-height terminal settling wall surface regions 15a, 15a positioned on opposite sides of the cover. Cover 14 also comprises low-height downwardly extending wall portions 20, 20 on opposite sides of the cover, and high-level wall surface region 15b, along with slanted wall surface regions 15c, 15c which are also positioned on opposite sides of cover 14. This embodiment, however is different from the previous embodiments in that peripheral side wall 2 of battery container 1 does not comprise a slanted peripheral side wall portion 2c, 2c, and it further does not comprise slanted upper edges 21, 21. Further, this embodiment does not include high-level peripheral side wall portions 2b and the high-level horizontal upper edges 2b. As a result, the entire peripheral side wall 2 of container 1 comprises a low-height peripheral side wall portion 2a' having a low-height horizontal upper edge $2a_1'$. Furthermore, low-height wall portions 19, 19 in this embodiment further comprise low-height horizontal upper edges $2a_1$ of low-height corner wall portions 2a, 2a which extend from the low-height horizontal upper edges $2a_1'$ and are at the same vertical level as these low-height horizontal edges $2a_1'$. As a result, the entire peripheral side wall 2 comprises a low-height perihperal side wall 2' whose horizontal upper edge entirely comprises a low-height upper edge $2a_1'$.

In addition, in this embodiment every partition wall 4 comprises two low-height end wall portions 4d, 4d at each end of wall 4. End wall portions 4d, 4d comprise low-height horizontal upper edges $4d_1$, $4d_1$ which are at substantially the same vertical level as the entire low-height peripheral side wall 2'. This structure facilitates, the welding of tabs 11a, 11a of the intercell connecting conductors 11, 11 to each other through perforation 10 in every partition wall 4 by use of a welding gun or the like on tabs 11a, 11a. Further, every partition wall 4 further comprises slanted wall portions 4c, 4c at each end of partition wall 4. Wall portions 4c, 4c comprise upper edges 21, 21 which are positioned between the high-level wall portion 4b which comprises hole 10, and wall portions 4d and 4d, in order to produce the same results discussed above in the previous embodiments.

Cover 14 has the same construction as the embodiments discussed above in that cover 14 still comprises low-height downwardly projecting wall portions 20, 20. However, in this embodiment, the entire downwardly extending peripheral side wall 16 of cover 14 is lowered compared to the wall 16 of the previous embodiments so as to face the upper edges of the low-height peripheral side wall 2' of container 1. As a result, the entire side wall 16 of cover 14 comprises a low-height downwardly extending peripheral side wall 16'. This low-height downwardly extending peripheral side wall 16' comprises low-height downwardly extending corner wall portions 16a, 16a and a remaining portion 16a'. Corner portion 16a, 16a comprise a low-height horizontal lower edges $16a_1$, $16a_1$. Remaining portion 16a' comprises a low-height downwardly extending horizontal lower edge $16a_1'$ which extends to and is at the same vertical level as the low-height lower edges $16a_1$, $16a_1$ of the low-height downwardly extending corner wall portions 16a, 16a. As a result of this structure, the entire low-height downwardly extending peripheral side wall 16' of cover 14 abuts the entire low-height horizontal upper edges $2a_1$, $2a_1$, and $2a_1'$ of the entire low-height peripheral side wall 2' of battery container 1, when cover 14 is placed on container 1. Furthermore, side wall 16' may be fused to upper edges 2a, 2a, 2a' by heating. In addition, each of the downwardly extending partition walls 17 of cover 14 comprises at each end a low-height downwardly extending wall portion 17d, 17d comprising low-height horizontal lower edges $17d_1$, $17d_1$ which are adapted to abut both low-height wall end portions 4d, 4d of each corresponding partition wall 4 of battery container 1, and are to be fused thereto by heating. Furthermore, each of the downwardly extending partition walls 17 comprises downwardly slanting wall portions 17c, 17c, each having slanted lower edges 22, 22. These slanted edges 22, 22 are positioned between and connect a high level horizontal lower edge $17b_1$ of a high-level downwardly extending partition wall portion 17b and low-height horizontal lower edges $17d_1$, $17d_1$ of the low-height partition wall portions 17d, 17d. These downwardly slanting wall portions 17c, 17c are adapted to be brought into contact with the slanting upper edges 21, 21 of the slanted wall portions 4c, 4c of each corresponding partition wall 4 of battery container 1.

The partition walls 17, 17 closest to each end of cover 12 further comprise low-height downwardly extending end wall portions 17a, 17a having upper edges 17a, 17a. In addition each side of end wall portions 17d, 17d comprises on either side thereof, a pair of communication walls 29 having a U-shaped groove 28 therebetween, which extends downwardly from the rear surface of battery cover 14 and which extends at right angles to end wall portion 17d of partition 17. Also provided is a single common vent tube 30 which communicates with the outside of the storage battery. Vent tube 30 is positioned on the inside of an intermediate cell chamber 3 which is intermediate between two cell chambers 3 at the ends of the battery. Vent tube 30 is positioned on the rear surface of top wall 15 of battery cover 14 and on the side of battery 14 which is opposite from the side at which the row of U-shaped grooves 28 are located.

Also provided is a ceramic filter 31 positioned in vent tube 30. In addition, each respective tubular filling opening 25 (which are positioned within the center of each cell 3) comprises a closure 32 mounted therein. Closure 32 is applied to opening 25 after the electrolyte has been poured into each of the cell chambers 3 of the storage battery. Thus, the storage battery that has such an opening 25 illustrated in FIGS. 13-17 comprises a maintenance-free sealed storage battery in which the electrode assembly, that is cells 5, in cell chambers 3 holds a predetermined amount of electrolyte impregnated therein.

Figure 18:
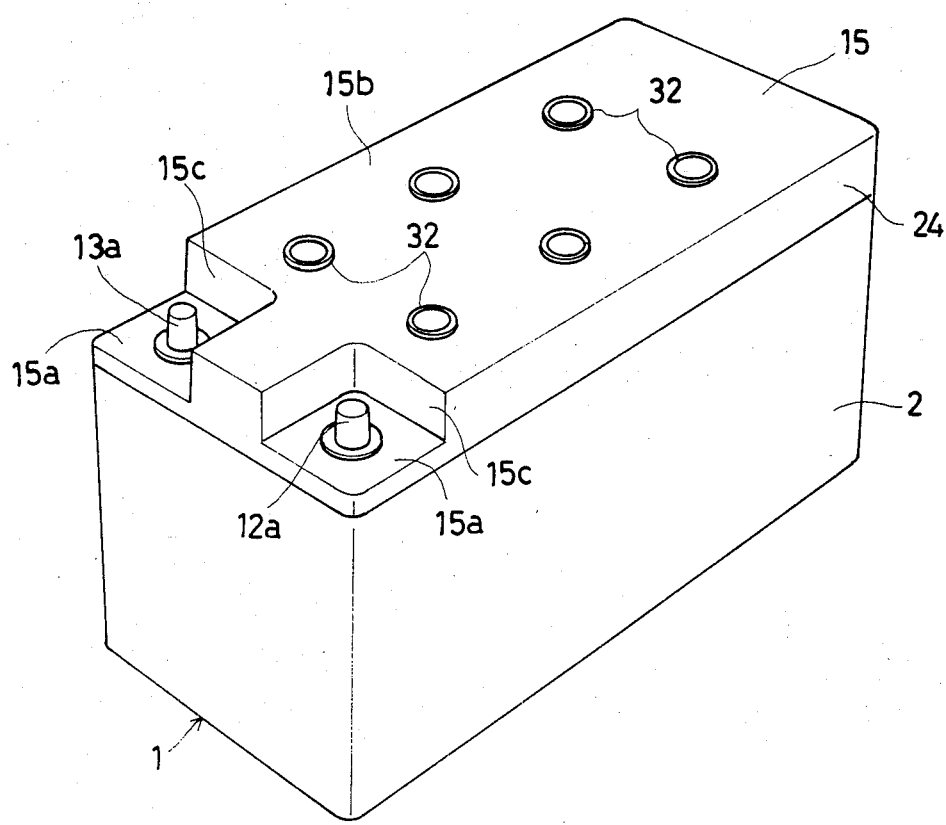
FIGS. 18-20 illustrate another embodiment of the present invention.
Figure 19:
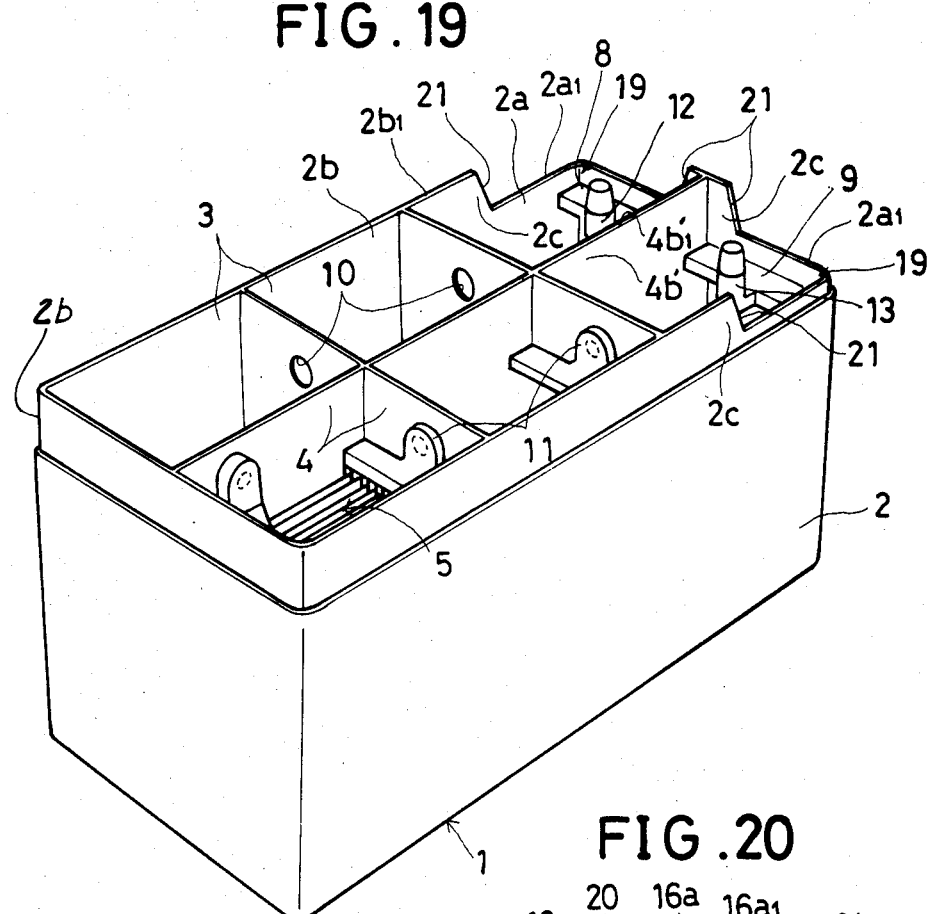
Figure 20:
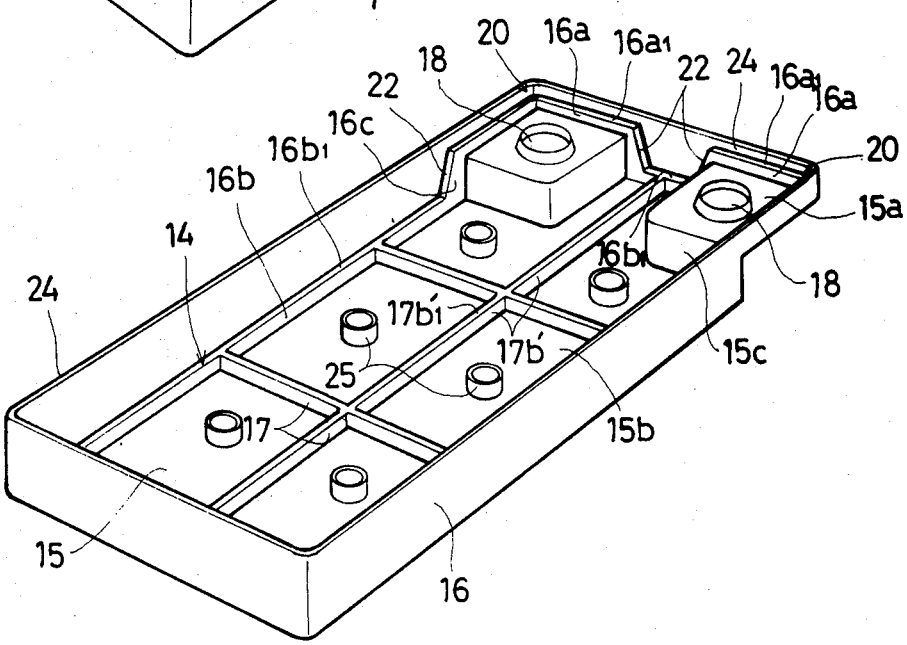

FIGS. 18-20 illustrate another embodiment of the present invention. In this embodiment, battery 1 is divided by partition walls 4 which cross each other longitudinally and laterally so that container 1 comprises two rows of three cell chambers 3 which may be formed in parallel to each other. Electrode assemblies or cells 5 that are contained within each cell chamber 3 are connected to each other in series and a negative terminal post 12 and positive terminal post 13 protrude upwardly from two cell chambers 3, 3 arranged side-by-side in the lateral direction, that is along one lateral side wall of battery container 1. Further, the embodiment illustrated in FIGS. 18-20 is the maintenance-free sealed storage battery described above. In this embodiment, only the substantially L-shaped corner wall portions surrounding negative terminal post 12 and positive terminal post 13, respectively, comprise low-height wall portions 19 having substantially L-shaped horizontal upper edges $2a_1$, $2a_1$ which are sufficiently low so as to be substantially at the vertical level of perforation hole 10 of partition wall 4. Further, each partition wall 4 comprises an entire high-level partition wall 4b' having a high-level horizontal upper edge $4b_1'$ that extends along the entire length of partition wall 4. The height of the entire high-level partition 4b' is substantially the same as that of the high-level horizontal upper edge $2b_1$ of the high-level peripheral side wall 2b of battery container 1.

In this embodiment, battery cover 14 comprises downwardly extending partition walls 17 which are adapted to face all of the high-level partition walls 4. Furthermore, all of the downwardly extending partition walls 17 comprise an entire high-level downwardly extending partition walls 17b' which has as high-level horizontal upper edge $17b_1'$ along the entire length of the downwardly extending partition wall 17. Furthermore, the two substantially L-shaped shaped corner portions of the downwardly extending peripheral side wall 16 are adapted to face the two substantially L-shaped low-level wall portions 19 of battery container 1. These downwardly extending portions 16 comprise low-height downwardly extending wall parts 20.

Battery container 1 further comprises slanted upper edges 21, 21 which are formed between the high-level horizontal upper edge $2b_1$ of the high-level peripheral side wall portions 2b and each of the low-height horizontal upper edges $2a_1$, $2a_1$ of the substantially L-shaped wall portions 19 so as to interconnect wall portions 19 and wall portions 2b. Similarly, battery cover 14 comprises a slanted downwardly extending peripheral side wall portion 16c which comprise slanting downwardly extending edges 22. These edges 22 are positioned between the substantially L-shaped low-height horizontal lower edge $16a_1$ of each of the low-height downwardly extending wall portions 16a, 16a, and the high-level horizontal lower edge $16b_1$ of each of the high-level downwardly extending wall portions 16b.

The intermediate wall surface regions 15c, 15c are not slanted as in the previous embodiments, but extend substantially vertically as is illustrated in FIGS. 18 and 20. These intermediate wall surface regions 15c, 15c interconnect the high-level horizontal wall surface region 15b and each of the low-height horizontal negative and positive terminal settling wall surface regions 15a, 15a. As a result, the wall portions of the battery container which surround the negtive terminal post and the positive terminal post are lowered so as to form low-height wall portions. The upper edges of these low-height wall portions are lower than the upper edge of the partition wall having perforation hole 10 therein. In addition, the negative and positive terminal settling surface regions 15a, 15a of the top wall of the battery cover comprises holes 18, 18 through which the negative terminal post 12 and positive terminal post 13 extend, respectively. Thus, termianl posts 12 and 13 may comprise low-height terminal posts of a low height. Their height is determined by the degree to which the substantially L-shaped walls of the battery cover are lowered to form the low-height horizontal edges $16a_1$, $16a_1$ of the substantially L-shaped low-height downwardly extending wall portions 20 of the downwardly extending peripheral side wall of the battery cover. Further, these edges $16a_1$, $16a_1$ are adapted to be brought into abutment with the substantially L-shaped lower-height horizontal upper edges $2a_1$, $2a_1$ of the low-height wall portions 19 of the container. Further, the vertical distance and space S between each of the low-height negative and positive terminal settling wall surface regions 15a, 15a of battery cover 14 and each of the negative and positive straps 7, 8 of terminals 12a and 13a in cell chambers 3 of battery 1 can be reduced over conventional batteries to 7-9 mm. At the same time the height from terminal straps 7 and 8 to holes 18, 18 can be shortened to 7-9 mm. Consequently, terminal posts 12 and 13 can be of smaller height than those of conventional storage batteries, thereby resulting in the production of a storage battery that has a reduced cost and increased output compared to conventional batteries.

In this embodiment, battery container 1 is also provided with slanted wall portions 2c having slanted edges 21. Edges 21 are formed between each end of the low-height horizontal upper edges $2a_1$ of the substantially L-shaped lower-level wall portions 19 of peripheral side wall 2 and the high-level horizontal upper edges $2b_1$ of the high-level wall portions 2b. Further, battery cover 14 is provided with slanted downwardly extending wall portions 16c which have slanted downwardly extending edges 22 adapted to abut edges 21. Edges 22 are positioned between each of the low-height horizontal lower edges $16a_1$ of the low-height wall part 16a of the downwardly extending peripheral side wall 16, and the high-level, horizontal lower edges $16b_1$ of the high-level downwardly extending wall portions 16b. As a result, when cover 14 and container 1 are heat sealed a good hermetically sealed battery is obtained.

Furthermore, according to this embodiment, the position of the perforated hole in the partition wall of the battery container is offset laterally from each of the horizontal bases of the intercell connecting conductors. In this embodiment as in the previous embodiments, the intercell connecting conductors are connected to positive and negative straps of adjacent cells on either side of a partition wall. The perforation hole is unaligned vertically with the horizontal base of the intercell connecting conductors so that when the intercell connecting conductors are welded, this welding can be carried out smoothly and without any fear that the forward end of the welding apparatus will contact the upper surfaces of the horizontal base of the intercell connecting conductors. Further, the level of the perforation hole can be lowered without the necessity of heightening the partition wall so that the height of the storage battery can be kept comparatively low and certainly lower than conventional storage batteries.

To summarize, either the entire vertical height of the battery container can be lowered or a portion of some of the elements of the battery container can be lowered in the above embodiments. As a result of this lowering of portions of the battery or of the entire battery container, portions of the battery cover or the entire battery cover are lowered. At a minimum, those wall portions surrounding the negative terminal post and the positive terminal post which are called the terminal settling wall area regions at the top wall of the battery cover are lowered compared to conventional battery covers. Also, the height of the terminal posts, at least from the straps to the terminal settling holes in the top wall of the cover can be shortened so as to permit the use of shorter terminal posts which have less electrical resistance, thereby increasing the output of the battery at a reduced manufacturing cost.

Although the invention has been described with respect to particular means, methods and embodiments, the invention is not limited therto but extends to all equivalents within the scope of the claims.

The foregoing specific sizes of the foregoing embodying examples shown in FIG. 1-FIG. 17 are suitable for a typical storage batteryof 40 Ah, 5 HR used for automobiles, and it is of course that those specific sizes of this invention storage battery may be varied with the change of the capacity thereof.

What is claimed is:

1. A storage battery comprising a container with a plurality of cell chambers, said cell chambers formed by a plurality of partition walls, each of said cell chambers including a cell having a negative strap which comprises means for interconnecting a row of tabs protruding upwardly from upper edges of negative plates of each of said cell, each said cell chamber further comprising a positive strap which comprises means for interconnecting a row of tabs which protrude upwardly from upper edges of positive plates of of each said cell, wherein a negative strap and a positive strap of adjacent cells are interconnected by intercell connecting conductors, adjacent intercell connecting conductors extending through an aperture in each of said partition walls, each of said connecting conductors comprising a horizontal base portion and an ear extending upwardly from said horizontal base portion, each said ear facing one of said apertures, wherein the negative and positive straps on opposite sides of said partition wall in adjacent cells are arranged in an aligned fashion, said aperture on each of said partition walls being vertically offset above the horizontal base portion of each of said intercell connecting conductors, wherein the horizontal base portion of each intercell connecting conductor is connected, at its horizontal base to either a negative strap of the cell or a positive strap of the cell, respectively, wherein said negative and positive straps are aligned on opposite sides of each partition wall and are interconnected by said conductors, wherein respective ears of said conductors extend upwardly and obliquely from said horizontal base portion, adjacent ears facing each other through said apertures, said adjacent ears being connected to each other by welding.

2. A storage battery having a battery container with a plurality of cell chambers defined by a plurality of partition walls positioned within the interior of said battery container, each of said cell chambers housing a cell, each said cell having a negative strap interconnecting a row of tabs protruding from upper edges of negative plates of said cell and a positive strap interconnecting a row of tabs protruding from upper edges of positive plates of said cell, wherein a negative cell strap and a positive cell strap are positioned adjacent to each other in adjacent cell chambers, said adjacent straps interconnected by intercell connecting conductors which extend through apertures in said partition walls, wherein one of said negative straps is attached to a negative terminal post positioned in a substantially upright fashion, one of said positive straps being attached to a positive terminal post positioned in a substantially upright fashion, said battery further comprising a box-like cover attached to said container, said battery cover having a downwardly depending peripheral side wall extending from the peripheral edge of a top wall of said cover, said cover including downwardly extending partition walls which partition the inside of said battery cover, said cover partition walls and peripheral side wall being adapted to abut and be hermetically adhered to the partition walls and a peripheral side wall, respectively, of said battery container, wherein said negative terminal post includes an upper section which extends through a negtive terminal receiving hole in the top wall of said battery cover and an upper portion of a positive terminal post extends through a positive terminal receiving hole in the top wall of said battery cover, said negative and positive posts comprising, respectively, a negative terminal and a positive terminal located on respective surface areas of the top wall of said battery cover, wherein the battery container wall portions surrounding said negative terminal post and said positive terminal post comprise relatively short wall portions with horizontal upper edges which are lower than the horizontal upper edge portions of each of the the partition walls of the container located above an aperture in each of said partition walls, wherein said surface areas of said battery cover, when said cover is positioned on said battery container, are positioned below the horizontal upper edge wall portions of the partition walls of the battery container which include said apertures.

3. A storage battery in accordance with claim 2, wherein said battery cover comprises downwardly extending wall portions which respectively surround said negative terminal posts and said positive terminal posts when said cover is attached to said container, wherein the horizontal lower edges of said downwardly extending wall portions are adapted to abut and be hermetically adhered to the horizontal upper edges of said relatively short wall portions of said battery container.

4. A storage battery in accordance with claim 2, wherein said short wall portions comprise two substantially L-shaped corners of said battery container.

5. A storage battery in accordance with claim 4, wherein reduced height portions of said downwardly extending wall portions of said battery cover comprise two substantially L-shaped corners of said cover.

6. A storage battery in accordance with claim 5, wherein said battery container includes slanted wall portions having angled upper edges, said slanted wall portions being located between each of the relatively short horizontal upper edges of said two substantially L-shaped corners of said battery container and the horizontal upper edge of a relatively tall portion of the peripheral side wall of said container, said battery cover comprising downwardly angled wall portions having angled lower edges located between each of the two substantially L-shaped corners and the lower edge of the remaining wall portion of the downwardly extending wall portion of the battery cover.

7. A storage battery in accordance with claim 6, wherein said battery container further comprises a slanted wall portion having an angled upper edge located between the relatively low horizontal upper edge of a relatively short portion of each partition wall and a relatively high horizontal upper edge portion of a relatively tall wall portion of each partition wall, said battery cover further comprising a downwardly angled wall portion having an angled lower edge located between the horizontal lower edge of relatively short wall portions of each cover partition wall and the horizontal lower edge of a relatively tall downwardly extending wall portion of each cover partition wall.

8. A storage battery in accordance with claim 2, wherein the peripheral wall of the battery container is uniform in height, said battery container peripheral wall being shorter than the horizontal upper edge of an intermediate wall portion of the partition wall located above each partition aperture wherein each partition wall of the battery container includes two end wall portions with relatively short horizontal upper edges which are substantially equal in height to the lower horizontal upper edge of said container peripheral walls, each of said partition walls comprising angled wall portions having angled upper edges which connect horizontal upper edges of the intermediate partition wall portions to upper edges of the end wall portions of the partition, wherein said battery cover downwardly extending peripheral wall includes a relatively long downwardly extending peripheral wall portion with a substantially horizontally extending lower edge which is adapted to abut the upper edge of the peripheral wall of said battery container, wherein each of said downwardly extending partition walls of said battery cover includes a relatively short intermediate wall portion having a substantially horizontal lower edge, relatively long end wall portions having a relatively low level horizontal edges, and an angled wall portion having an angled lower edge, each of said angled wall portions of said cover partition walls connecting the horizontal lower edge of each intermediate cover partition wall portion with the substantially horizontal lower edged of the end wall portions of each of said partition walls.

9. A storage battery in accordance with claim 2, wherein one of said negative straps is attached to a negative terminal post extending upwardly from the one negative strap, one of said positive straps comprising a positive terminal which includes a positive terminal post extending upwardly from said one positive strap, said storage battery further comprising a substantially box-like battery cover adapted to be attached to the battery container, said cover having a downwardly extending peripheral side wall extending downwardly from a peripheral portion of a top wall of said cover, and downwardly extending partition walls comprising means for partitioning the interior space of said battery cover, said cover peripheral wall and partition walls being adapted to be brought into abutment with, and hermetically adhered to, a peripheral side wall and the partition walls, respectively, of the battery container, wherein said negative terminal post includes an upper section which extends through a receiving hole in the top wall of said battery cover and an upper portion of said positive terminal post extends through a receiving hole in the top wall of said battery cover, said negative and positive posts comprising, respectively, a negative terminal and a positive terminal located on respective surfaces of the top wall of said battery cover, wherein the battery container wall portions surrounding said negative terminal post and said positive terminal post comprise reduced height wall portions with horizontal upper edges which are lower than the horizontal upper edges of each of the partition wall portions located above the aperture in each said partition wall.

* * * * *

UNITED STATES PATENT AND TRADEMARK OFFICE
CERTIFICATE OF CORRECTION

PATENT NO. : 4,724,190

DATED : February 9, 1988

INVENTOR(S) : Tomokazu SHIGA et al.

It is certified that error appears in the above-identified patent and that said Letters Patent is hereby corrected as shown below:

On the cover page, item [75], line 1, "Siga" should be changed to ---Shiga---.

At column 2, line 36 of the printed patent, change "undesireable" to ---undesirable---.

At column 2, line 44 of the printed patent, change "undesireable " to ---undesirable---.

At column 6, line 45 of the printed patent, delete "the".

At column 8, line 47 of the printed patent, change "from" to ---form---.

At column 10, line 23 of the printed patent, insert ---.--- after "container".

Figure 17:
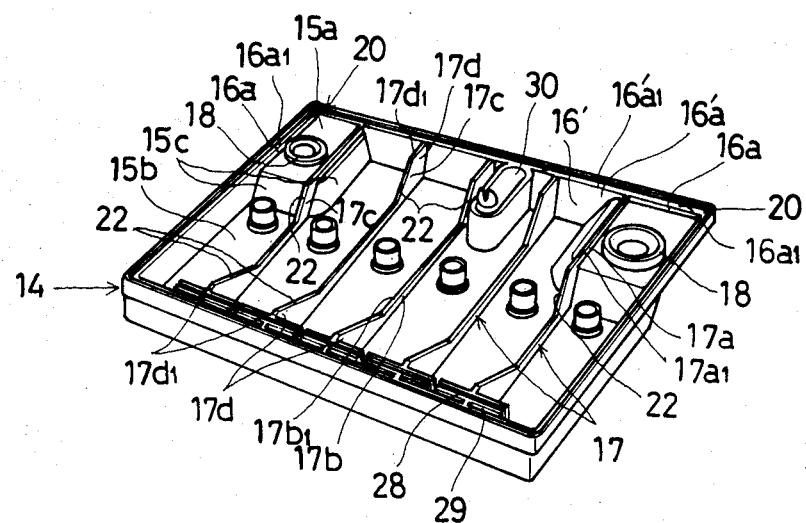

At column 11, line 25 of the printed patent, insert ---a--- after "Fig. 17 is".

At column 14, line 34 of the printed patent, change "smoother" to ---smooth---.

At column 14 line 51 of the printed patent, change "fromt he" to ---from the---.

At column 15 line 16 of the printed patent, change "partion" to ---partition---.

At column 19, line 18 of the printed patent, change "perihperal" to ---peripheral---.

At column 22, line 61 of the printed patent, change "therto" to ---thereto---.

At column 23, line 11 (in claim 1, line 10) of the printed patent, delete "of", second occurrence.

At column 23, line 63 (in claim 2, line 29) of the printed patent, change "negtive" to ---negative---

UNITED STATES PATENT AND TRADEMARK OFFICE
CERTIFICATE OF CORRECTION

PATENT NO. : 4,724,190

DATED : February 9, 1988

INVENTOR(S) : Tomokazu SHIGA et al.

It is certified that error appears in the above-identified patent and that said Letters Patent is hereby corrected as shown below:

At column 24, line 6 (in claim 2, line 41) of the printed patent, delete "the" after "of each of".

Signed and Sealed this

Fourth Day of October, 1988

Attest:

DONALD J. QUIGG

*Attesting Officer*  *Commissioner of Patents and Trademarks*